B. WORTHINGTON.
COTTON PICKER.
APPLICATION FILED MAR. 22, 1911.
1,020,867.
Patented Mar. 19, 1912.
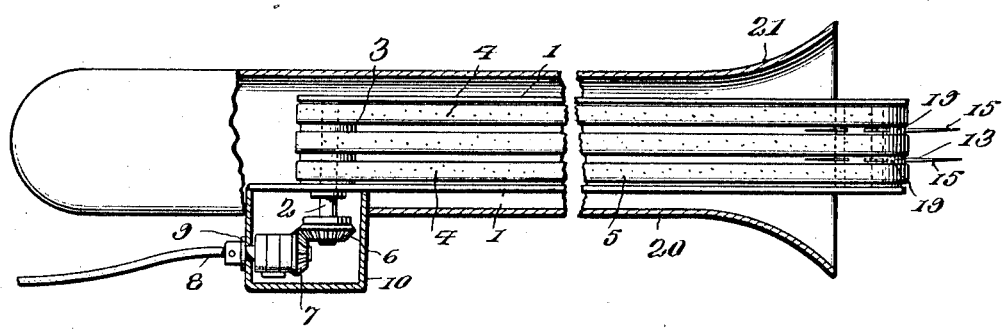
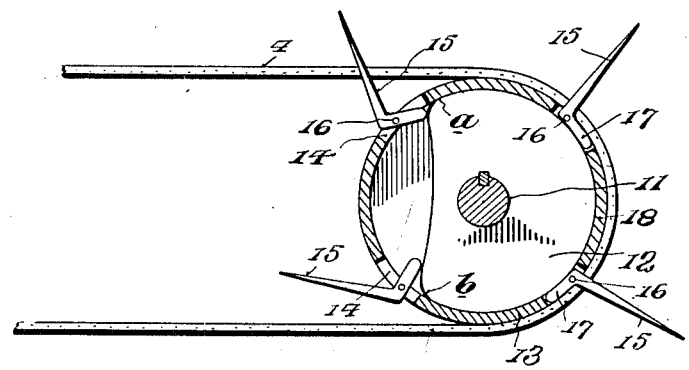

UNITED STATES PATENT OFFICE.

BRUCE WORTHINGTON, OF WINCHESTER, VIRGINIA, ASSIGNOR TO WORTHINGTON COTTON HARVESTER COMPANY, A CORPORATION OF DELAWARE.

COTTON-PICKER.

1,020,867.   Specification of Letters Patent.   Patented Mar. 19, 1912.

Application filed March 22, 1911. Serial No. 616,209.

*To all whom it may concern:*

Be it known that I, BRUCE WORTHINGTON, a citizen of the United States, residing at Winchester, in the county of Frederick and State of Virginia, have invented certain new and useful Improvements in Cotton-Pickers, of which the following is a specification.

This invention relates to improvements in manually directed cotton pickers.

The object of the invention is to provide a mechanism which will rapidly and effectually remove the cotton from the cotton bolls and automatically deliver the same, through a suitable chute, to a receptacle carried by the operator.

The invention consists in the main of providing a suitable carrier driven by any suitable power, and the provision of picker pins which, when extended into the cotton to be picked, will be maintained rigidly in picking position, but which will, as they are moved toward the operator at a predetermined point, have their rigidity destroyed, so that they will be readily and successively withdrawn from the cotton and caused to disappear below and between the carrier or belts, leaving the cotton upon the carrier to be carried toward the operator by the belts and dropped into a receptacle.

In a minor degree, the invention consists in the novel construction of the carrier and in the frame or body of the picker by which the whole device may be conveniently and effectually manipulated, in the picking operation.

As shown in the drawings, I prefer to make the body of the picker in the form of a pistol, and I provide a comfortable hand grip with a suitable trigger in convenient position in advance of the grip to be manipulated by the finger of the operator, to diminish or increase the speed of the carrier or throw the same out of gear entirely, as the exigencies of the case may require.

Referring to the drawings, Figure 1 is a top plan view partially in section; Fig. 2 is an enlarged longitudinal section of the picker end of the device, showing the means for supporting the picker pins in rigid position, and the manner in which the support for the pins is taken away to render the pins yielding or inactive, and Fig. 3 is a side elevation of the picker with the forward part of the body broken away, showing the arrangement of the carrier with relation to the body.

Referring to the drawings, the numeral 1 represents two rigid side bars between the rear ends of which is mounted a driving shaft 2 carrying a drum or pulley 3, over which the individual belts 4 of a carrier 5 pass. The driving shaft is provided at its outer end with a miter gear wheel 6 which meshes with a similar wheel 7 driven by a flexible shaft 8, which is mounted in the bearing 9 in a housing 10, suitably secured to one of the side bars 1.

The forward ends of the side bars are rigidly connected by a cross-bar 11 having keyed thereto a stationary cam 12. Revoluble upon this cam is a drum 13 recessed at intervals as indicated at 14 for the reception of the picker pins 15, which are pivoted at 16 in said recesses. Each picker pin is provided with a foot 17 which, when the drum is revolved, will obviously successively ride on the circular portion 18 of the cam 12, until they reach the point *a* of the cam, when they will be free to rock upon their pivots. As soon, however, as the pins reach the point *b*, Fig. 2, it will be noted that the feet will engage the cam at this point, and will be instantly straightened up and as they ride on to the curved portion 18, will be held in rigid or picking position. This construction is clearly shown in Fig. 2 of the drawing. I prefer to employ two sets of picker pins and to make the carrier of three individual belts, thus producing two kerfs 19, through which the picker pins pass.

The numeral 20 designates a chute which is generally circular in cross section, flared at its forward end, as indicated at 21 and provided with depending side flanges 22 by which it is attached to the side bars 1, preferably by means of screws 23. This chute extends rearwardly beyond the main body of the device and its end is dipped downwardly so as to deliver the picked cotton into any suitable receptacle carried by the operator. Securely attached to the side bars is a pistol-like grip 24, in advance of which is a trigger which has connection with suitable clutch mechanism, not here shown, by which the operator may control the speed of the carrier and start and stop the same as may be required.

In operation, the power is turned on, and through the gear connections, will rapidly revolve the drum 3, which in turn will run the belts of the carrier. The frictional engagement between the belts and the drum 13 will rapidly revolve said drum and cause the picker pins to revolve around the cam 12. As long as the picker pins are running against the curved portion 18 of the cam, they will be maintained in upright substantially rigid position, or the position in which they are picking the cotton. However, as soon as the pins pass to the cut away portion of the cam, they will be free to rock on their pivots and will no longer have any action upon the picked cotton, but will be simply withdrawn from the cotton and caused to disappear below the belts. Thus the upper surface of the carrier will quickly strip the cotton from the pins, deposit it upon the top of the carrier or belts, where the succeeding picked cotton will have a tendency to force it through the chute, aided by the carrying tendency of the belt, toward the operator, and through the open rear end of the chute into a suitable receptacle carried by the operator.

Experiment has demonstrated that the device may be made extremely light, and the speed of the carrier may be such that the picking of the cotton is extremely rapid and effectual, the pins at all times completely stripping the boll of every vestige of cotton and the construction is such that no clogging will occur.

It will be noted that the construction and arrangement of the picker pins and belts make possible a highly efficient stripping operation, by reason of the disappearance of the pins between the kerfs, at the time that the rigidity of the pins is destroyed, and at the time that the belts are running in a direction different from the direction of the movement of the disappearing pins, thus depositing the cotton upon the carrier, without any tendency whatever to draw any of the fiber through the kerfs.

I have shown two sets of picker pins and three belts constituting the carrier, but obviously, I may employ only two belts for the carrier and one set of picker pins on the drum, the teeth in such construction, passing between the single kerf between the two belts.

Having thus described my invention, what I claim is:

1. A cotton-picker having in combination, an unyielding, rigidly fixed cam having a substantially cylindrical surface, a portion of said surface being cut away, a rotatable drum journaled on the cam, picker-pins carried by the drum and arranged to be engaged by the cylindrical surface of the cam, and means for rotating the drum so as to cause said cylindrical surface to force the picker-pins into rigidly-extended positions.

2. A cotton-picker having in combination, an unyielding, rigidly fixed cam having a substantially cylindrical surface, a portion of said surface being cut away, a rotatable drum journaled on the cam and provided with a plurality of rows of recesses or slots, picker-pins pivoted within said recesses and arranged to swing freely and collapse within the cut away portion of the cam when the drum is rotated, and means for rotating said drum.

3. A cotton-picker having in combination, an unyielding, rigidly fixed cam having a substantially cylindrical surface, a portion of said surface being cut away, a rotatable drum journaled on the cam, collapsible picker-pins carried by the drum and arranged to be engaged by the cylindrical surface of the cam, to force them into rigidly extended positions, and to swing freely within the cut away portion of the cam, and means for rotating the drum to cause the picker-pins to be alternately extended and collapsed.

4. In a cotton picking tool, the combination of a suitable frame, a carrier formed of a plurality of belts arranged side by side in close proximity to each other, a revoluble body suitably supported at the front end of the frame and having rockably secured thereto a plurality of picker pins adapted to be extended into the cotton to be picked, a solid surface cam within said revoluble body, adapted to be engaged by the picker-pins to hold them stationarily extended while in picking position, said cam having a cut away portion so as to permit the pins to be rocked after they have passed the picking position, said picker pins being so arranged on the revoluble body that they will pass through the spaces between the carrier belts, whereby, after the cotton has been picked, it will be deposited upon the upper surface of the carrier, and means for driving the carrier and picker pins.

5. In a cotton picking tool, the combination of a suitable frame, a driving drum mounted in the rear of the frame, a stationary, solid-surface cam suitably supported in the front of the frame, and having its rear portion cut away, a revoluble drum surrounding said cam, a plurality of spaced belts adapted to be driven by the driving drum, means for driving the rear drum and, through the belts, the forward drum, picker pins carried by the front drum, and when said drum is revolved, engaging the surface of the cam, whereby the picker pins will be maintained rigidly in picking position, but will be permitted to collapse when they pass from picking position to the cut away portion of the cam, and a suitable chute mounted upon the upper part of the body above the belts, and having open front and rear ends and adapted to guide the picked cotton in its movement from the front to the rear of the tool.

In testimony whereof I affix my signature in presence of two witnesses.

BRUCE WORTHINGTON.

Witnesses:
TITIAN W. JOHNSON,
FRANK G. BRERETON.